United States Patent [19]

Nagasawa et al.

[11] Patent Number: 4,459,753
[45] Date of Patent: Jul. 17, 1984

[54] SELF-STRAIGHTENING TAPE MEASURE OF SYNTHETIC RESIN AND A PROCESS FOR PREPARING THE SAME

[75] Inventors: Takashi Nagasawa, Kusatsu; Junichi Shimura, Ikoma, both of Japan

[73] Assignee: Sekisui Jushi Kabushiki Kaisha, Osaka, Japan

[21] Appl. No.: 292,938

[22] Filed: Aug. 14, 1981

[30] Foreign Application Priority Data

Aug. 14, 1980 [JP] Japan .................................. 55-112202

[51] Int. Cl.$^3$ .............................................. G01B 3/10
[52] U.S. Cl. .................................................. 33/137 L
[58] Field of Search .................................. 33/137–139; 264/137, 285, 257

[56] References Cited

U.S. PATENT DOCUMENTS 2,526,945 10/1950 Gray ................................. 264/137 X
3,073,544 1/1963 Cirues et al. ..................... 33/138 X
3,409,988 11/1968 Zelnick ............................. 33/137 R

OTHER PUBLICATIONS

Japanese Opened Utility Model Appln. under Laying-Open No. 48-10465, Published in 1973.
Japanese Opened Utility Model Appln. under Laying-Open No. 55-106804, Published Jul. 25, 1980.
Japanese Opened Utility Model Appln. under Laying-Open No. 55-106805, Published Jul. 25, 1980.
Japanese Opened Utility Model Appln. under Laying-Open No. 55-113230, Published Aug. 9, 1980.

Primary Examiner—Harry N. Haroian
Attorney, Agent, or Firm—Armstrong, Nikaido, Marmelstein & Kubovcik

[57] ABSTRACT

A self-straightening tape measure which is commonly called a convex rule, has hitherto been prepared exclusively of steel, however, the tape measure of steel is not only liable to be rusted but also is dangerous owing to good conductor of electricity when used in the vicinity of electric wires. In order to eliminate the above disadvantages, the present invention provides a self-straightening tape measure of resin, which is prepared by impregnating a tape material of crossing fibers with a large amount of thermosetting resin, bending the tape material in the width direction to form an arc in cross section, so that the arc may occupy from one-third to three-fourths of the whole circumference of the circle described by extending the arc, and heating the tape material to harden the resin and to have the said arcuate form.

1 Claim, 8 Drawing Figures

SELF-STRAIGHTENING TAPE MEASURE OF SYNTHETIC RESIN AND A PROCESS FOR PREPARING THE SAME

This invention relates to a self-straightening tape measure of synthetic resin and a method for manufacturing the same.

The self-straightening tape measure means a flexible tape measure which is wound around a reel and kept in an outer case while unused, but in use the tape measure is drawn from the case to form a straightening state owing to its rigidity so that it can extend straight at a distance from several tens to one hundred centimeters, when the case alone is held.

Hitherto the self-straightening tape measure has been made exclusively of a band steel. Particularly, the conventional self-straightening tape measure has been prepared by bending the band steel in the width direction thereof to form a valley extending in the longitudinal direction thereof. The tape measure, however, is made of a metal and of a good conductor of electricity, accordingly cannot be used for electrical engineering works and the like. In fact, it is required to use the tape measure in the vicinity of electric wires and the accidents sometimes happened that the workmen were killed by electric shock caused by contacting the steel measure with the electric wires. In addition, the tape measure of metal has the disadvantages that it is liable to be rusted and eroded. Thus, the self-straightening tape measure of other materials than the steel is desired.

On the other hand, a tape measure is known which is prepared by employing glass fibers as a base material, and a thermosetting resin as a bonding agent. Such the tape measure is disclosed in the Japanese published unexamined utility model application laying-open No. 48-10465. The published application discloses that the tape material must be curved in a large way, increased in the width thereof, and have a big thickness so far as the tape material can be flexible. The disclosures, however, are brief, vague and unclear, for example, the particular meanings that the material must be curved in a large way cannot be understood.

Even if the Japanese published unexamined utility model application laying-open No. 48-10465 teaches that the material must be curved with steep slopes in the width direction thereof, the said application does not teach a satisfactory tape measure which can be straightened by itself, because the synthetic resin is simply used as the bonding agent for the tape material. More particularly, so far as the resin is used in such a small amount that is called the bonding agent, it cannot be possible for the tape to maintain a curvature in the width direction thereof for a long period of time. In other words, if the tape measure should be temporarily curved, such curvature is liable to disappear on account of creep and stress relaxation of the synthetic resin. Thus the tape measure according to the said utility model application cannot have a sufficient self-straightening property, and cannot be maintained in a straight state when drawn horizontally in a distance as long as about 1 meter. Accordingly the tape measure cannot be practically used.

Under the said circumstances, the inventors attempted to manufacture a self-straightening tape measure using the synthetic resin, and have found that the tape measure excellent in self-straightening property can be obtained if the amount of the synthetic resin is increased in comparison with the amount used as the bonding agent and the tape material is impregnated with a comparatively much amount of the synthetic resin, and if a curvature in the width direction of the tape material falls within a specific range. In general, the tape measure of the synthetic resin tends to lose the curvature and to be flattened to some degree while being used, and hence it is required that the tape measure have such a curvature that the arc length in the width direction is more than one-sixth of the circumference of the circle described by the arc while the measure is being used, however, the tape measure should have such curvature that the arc length is more than one-third of the said circumference when manufactured.

According to the present invention, there is provided a self-straightening tape measure of synthetic resin which comprises a tape material prepared by crossing fibers and a thermosetting resin covering the tape material, the tape material and the resin being integrated to form a tape matrix, which is bent together in the width direction thereof to form an arc in cross section, so that the arc length comes under the range from one-sixth to three-fourths of the whole circumference of the circle described by the arc.

According to the present invention, there is further provided a method for manufacturing a self-straightening tape measure of synthetic resin, which comprises impregnating a tape material prepared by crossing fibers with a thermosetting resin still in an unhardened state, superimposing thus impregnated tape on a belt, bending the tape together with the belt in the width direction thereof to form an arc in cross section while the belt is being moved in the longitudinal direction thereof, adjusting a curvature of the arc so that the arc may occupy from one-third to three-fourths of the whole circumference of the circle described by the arc, heating the tape to harden and give the resin this curvature, and thereafter removing the tape from the belt to obtain a self-straightening tape measure.

Refering to the accompanying drawings, explanations are made of one embodiment of the present invention.

Figure 1:
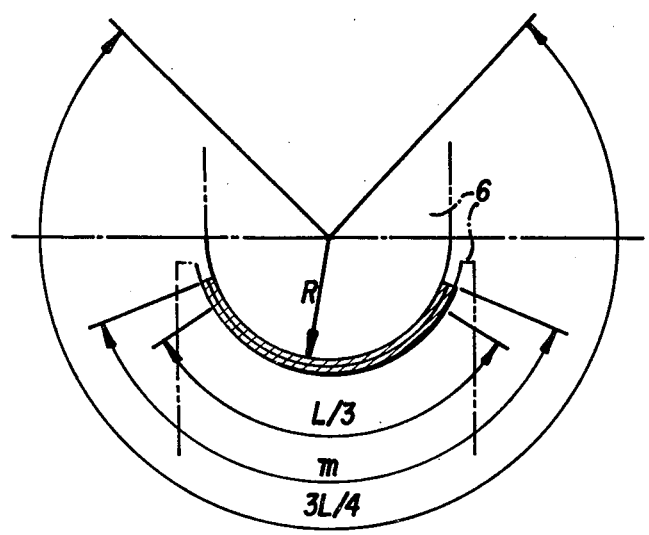
FIG. 1 is a schematic cross-sectional view of the self-straightening tape measure according to the present invention.
Figure 2:
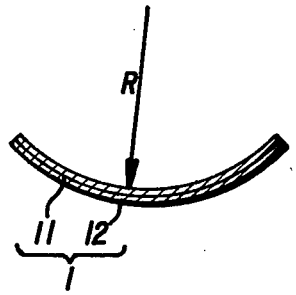
FIG. 2 is a cross-sectional view of the tape measure according to the present invention which has been subjected to heat-cycling tests.
Figure 3:
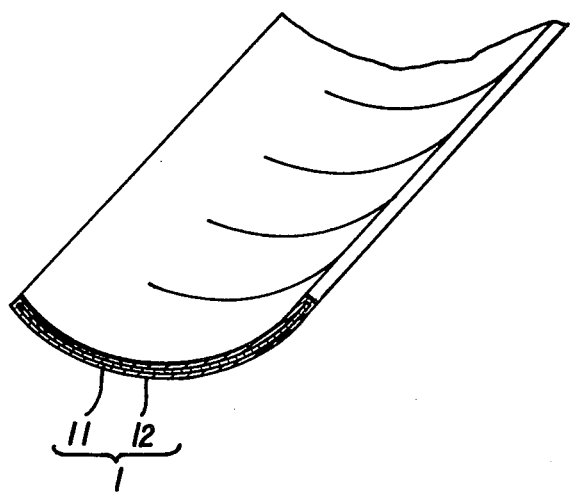
FIG. 3 is an askance view of the tape measure, partly cut away, according to the present invention.

In the drawings, numeral reference 1 denotes a measure matrix which is prepared by impregnating a tape material 11 with a thermosetting resin, and by setting the resin to form a resin layer 12 which covers the tape material and is integrated with the tape material, wherein the tape material 11 is prepared by crossing inorganic or organic fibers. Among the inorganic fibers, glass fibers are preferably used, and if electrical conductivity is ignored, carbon fibers may be used. Among the organic fibers, use can be made of various synthetic fibers, for example, polyamide fibers, polyester fibers, aromatic polyamide fibers, polyvinyl acetal fibers and the like. The tape material 11 may be a woven tape in which a number of glass fibers are arranged in parallel relation to form warps and a number of glass fibers are disposed in a crossing relating with the warps to form a woven tape cloth. The tape material 11 may be a nonwoven tape in which a number of glass fibers are irregularly disposed to form a plane. The tape material is preferably extended integratingly throughout the measure matrix, that is, without being cut and connected at middle portions of the measure matrix. Thus the tape material has normally a length of 1 to 5 meter and a width of 10 to 30 mm.

As for the thermosetting resin, it may be an unsaturated polyester resin, epoxy resin, acrylic resin and the like. Heat-resistant unsaturated polyester resin is preferably used. The reason why the heat-resistant unsaturated polyester resin is preferable is that the resin has a proper rigidity and restoring property and further can be firmly adhered to the glass fibers and other fibers, so that the resin is especially suited for realizing the self-straightening property aimed at in this invention. The tape material is impregnated with the resin which includes a catalyser for setting it but which is still in an unhardened state, the resulting tape material is then heated to harden the resin and thus forms a measure matrix 1.

In order to prepare the tape measure in this invention, a catalyser for hardening the resin is added to a thermosetting resin still in the unhardened state and mixed well to form an hardenable resin. Tape material 11 is impregnated with the hardenable resin to form a impregnated material. The impregnated material is then bent in the width direction thereof to have a radius of curvature R, and as shown in FIG. 1, while the impregnated material is maintained in an arcuate form in cross section in the width direction thereof, the impregnated material is heated to harden the resin and to form a measure matrix 1. In this case, the fibers should be impregnated with the resin in a proportion of 85 to 50 parts by weight of the fibers and 15 to 50 parts by weight of the resin. In order to harden the resin in the arcuate form in cross section, various methods can be employed such as a pressing method in which the impregnated material is moulded in an arcuate cavity, a slit method in which the impregnated material is passed through a slit having an arcuate cross section, an endless belt method in which the impregnated material is put on an endless belt and bent together with the belt while the belt is moved, and a mandrel method in which the impregnated material is shaped while being moved along a mandrel.

If the width of the measure matrix, i.e., the length of the arc in cross section of the measure matrix 1 in FIG. 1 is expressed by m, and the circumferential length of the circle of curvature radius R described by the arc is expressed by L, then m should be more than one-sixth and less than three-fourths of L. The reasons for this are that, if m is less than one-sixth of L, then the self-straightening property intended in this invention cannot be obtained, that is, when the measure matrix is extended and held at only one end thereof, the measure matrix cannot be maintained in a straight state extending horizontally more than 1 meter, and that, if m is more than three-fourths of L, then the measure matrix cannot be flattened and wound around a reel on account of formation of folding portions at both sides of the measure matrix when the measure matrix is rolled in a case, and further when the measure matrix is graduated the graduation is hard to read. The graduation can be made on the outer surface besides the inner surface of the measure matrix.

Figure 4:
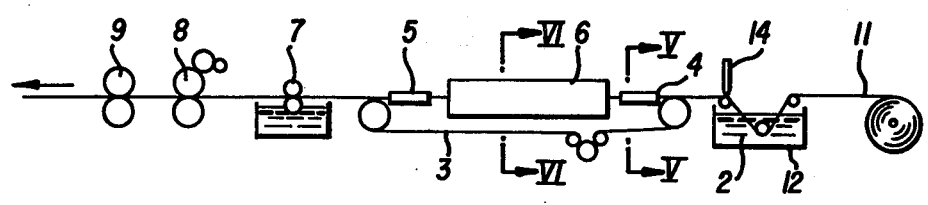
FIG. 4 is a schematic view showing an embodiment of the process according to the present invention.

Referring to FIG. 4, outlines of the preparing method are explained hereinafter. A numeral reference 11 denotes a tape material, 2 resin-impregnating vessel, 12 thermosetting resin (containing a hardening agent but in a still unhardened state), 3 endless belt, 4 a belt-folding means, 5 a belt-releasing means, 6 a forming means, 7 a colouring vessel, 8 a graduation printing means, and 9 a resin coating means.

The tape measure in the present invention is prepared in the following manners: At first, the tape material 11 is introduced into resin-impregnating vessel 2, wherein the tape material 11 is impregnated with the thermosetting resin 12 which is still in an unhardened state. The thermosetting resin 12 may be polyester resin, epoxy resin, which is liquid while being in the unhardened state, and can impregnate the tape material if only the tape material is immersed in the resins. If desired, the tape material may be mechanically pressed to help the resin entering into the tape material. Excessive resin may be removed by a squeezing means 14. Thus, the tape material 11 is impregnated with the resin 12 to form an impregnated material.

Figure 5:
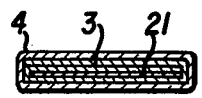
FIG. 5 is a cross-sectional view of the apparatus taken along the line V—V in FIG. 4.

The impregnated material is placed on an endless belt 3 and entered into a folding means 4 together with the belt 3. The folding means 4 folds the belt 3 in the width direction to overlap both sides thereof and hold the impregnated material between the folded portions in the belt 3. Thus, as seen in FIG. 5, the belt 3 wrapps and surrounds the impregnated material 21. In this state, the belt is passed through the folding means 4 and entered into the forming means 6.

The forming means 6 is a kind of heating means having a slit, which is extending through the means and is of a size just sufficient to allow the belt 3 including the impregnated material 21 to pass the slit. The slit is flattened in the cross section thereof at the portion near to the belt being folding means 4, however, the slit is gradually curved towards the other side, and most part of the slit is bent to have a curvature radius r as mentioned above. Consequently, belt 3 is folded and flattened when it passes through the inlet side of the slit, however, it is bent on the way and goes out of the slit in a curved state. Further, the forming means is designed to heat the slit, hence the belt passing through the slit, accordingly also the impregnated material are heated and the resin is hardened. Consequently the impregnated material is hardened to form a measure matrix.

The maximum of curvature radius r in the forming means 6 should be less than the maximum of curvature radius R required in use of the measure matrix. It is because the curvature tends to be flattened to some degree while the measure matrix is used after having been manufactured as mentioned above. Thus, in the forming means 6 the arc length in the width direction must be more than one-third and less than three-fourths of the circumference of the circle of the curvature radius r.

The belt 3 having passed through the forming means 6 is then entered into a belt-releasing means 5. The belt-releasing means 5 unfolds the belt 3 around the impregnated material 21 by the elements aligned in the order adverse to that in the belt-folding means 4, and thus exposes the impregnated material 21. Prior to entering into the belt-releasing means, the resin in the impregnated material has been hardened and the impregnated material has become a measure matrix. Thus the belt 3 leaves the belt-releasing means 5, and then the measure matrix is advanced apart from the belt 3.

After the measure matrix has been separated from the belt 3, the measure matrix is entered into a colour coating vessel 7. In the vessel 7 the measure matrix was coated with the necessary colourant. Thereafter the measure matrix is entered into a graduation printing machine 8, in which the measure matrix is graduated. Thereafter, the measure matrix is entered into a coating machine 9, in which the measure matrix is coated with a transparent resin, so that the graduation is protected from disappearing by abrasion. Thus, the measure matrix itself has been completed.

Endless belt 3 is preferably prepared by fluorocarbon resin reinforced by fibers. It is because the fluorocarbon resin is not only less sticky to the thermosetting resin and hence is convenient for folding and unfolding the endless belt around the impregnated material 21 to wrap and unwrap the material 21, but also is tenaceous and heat-resistant. The belt folding means 4 and the belt unfolding means 5 may be of a guide plate type or may be of a roll type. By the guide plate type is meant the type in which a plate or plates having a little bigger width than that of the belt 3 are arranged along the belt 3 and plates are folded gradually inwardly from one end to the other to have cross sections changing gradually from a flat state to a folded state. Thus, the belt 3 is gradually folded inwardly while advanced along the plates. By the roll type is meant the type in which a number of paired rolls are arranged instead of the plates and the belt is gradually folded inwardly while advanced along the paired rolls. The belt may be folded by a combination of the guide plate type and the roll type. The belt-releasing means may be formed by disposing elements of the belt-folding means in the adverse order.

Figure 6:
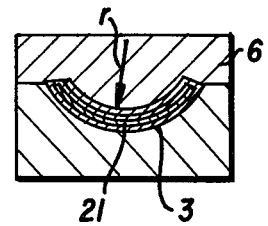
FIG. 6 is a cross-sectional view of the apparatus taken along the line VI—VI in FIG. 4.

FIG. 6 shows the forming means 6 having a slit therein, however, the forming means is not limited to that of such a type. For example, the forming means may be formed by a number of paired rolls, each pair comprising a concave roll and convex roll, the concave roll having a concave surface of radius r in the axial section thereof, and the convex roll having the corresponding convex surface. In case of the forming means having a slit, the forming means should preferably be formed by matching the male portion and female portion as shown in FIG. 6, wherein the male portion is prepared to have a convex surface curved to have a curvature radius r, and the female portion is prepared to have the corresponding concave surface. The curvature radius r in the forming means 6 is of the same shape from one end to the other.

The conventional vessels or means can be used for the resin vessel 2, colour coating vessel 7, graduation printing means 8, and resin coating means 9.

Figure 7:
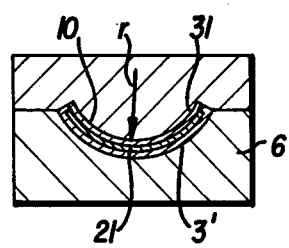
FIG. 7 is a cross-sectional view corresponding to FIG. 6 of the apparatus in another embodiment of the process according to the process.

When the impregnated material 21 is hardened in the forming means 6 to become measure matrix while conveyed by the endless belt 3, the impregnated material 21 may be interposed between and sandwiched by two endless belts, instead of one endless belt being folded around the impregnated material, and then entered into the forming means 6 as shown in FIG. 4, particularly as in FIG. 5. FIG. 7 shows the impregnated material sandwiched by the endless belts entered in the forming means. More particularly in FIG. 7, the impregnated material 21 is interposed between the lower endless belt 3' and the upper endless belt 10 and positioned in the forming means 6. In this case, the belt 3' is preferably provided with a shallow groove 31, width of which is equal to that of the impregnated material 21. When the impregnated material 21 is fitted in the groove 31, the impregnated material 21 is prevented from moving in the width direction thereof, and post-fabrication can be conveniently simplified.

The present invention is illustrated by way of Examples and Comparative Examples.

EXAMPLES AND COMPARATIVE EXAMPLES

Tape cloths of glass fibers were used as the tape material, a thermosetting polyester resin was used for the resin, and tape measures were prepared which have various widths and curvatures. Studies were made of the tape measures as to whatever self-straightening properties the tape measures would have when the widths and curvatures of the tape measures were changed, particulars of which are as mentioned below.

Two woven cloths of glass fibers having the thickness of 0.18 mm, width of 19 mm and length of 1.5 m were prepared, and four woven cloths of glass fibers having the same thickness and length and the width of 25 mm were prepared. These cloths were impregnated with the thermosetting polyester resin, which contained a catalyser for hardening the resin but was still in an unhardened state, to form impregnated materials containing 30% by weight of the resin. The impregnated materials were curved in the width direction thereof to have the following curvature radius r and hardened in this state to give a measure matrix, all of which have the thickness of 0.3 mm.

Example 1 = measure matrix comprising the cloth of 19 mm in width and having the curvature radius r of 8 mm Example 2 = measure matrix comprising the cloth of 19 mm in width and having the curvature radius r of 9 mm Example 3 = measure matrix comprising the cloth of 25 mm in width and having the curvature radius r of 8 mm Example 4 = measure matrix comprising the cloth of 25 mm in width and having the curvature radius r of 9 mm Example 5 = measure matrix comprising the cloth of 25 mm in width and having the curvature radius r of 10 mm Example 6 = measure matrix comprising the cloth of 25 mm in width and having the curvature radius r of 11 mm In order to investigate the self-straightening property in use of the measure matrixes obtained in Examples 1 to 6, the measure matrixes were subjected to a heat cycling test, in which the measure matrixes were at first cooled to −30° C. and held at this temperature for 3 hours, then heated to 70° C. and held at 70° C. for 3 hours, such cooling and heating were made to one cycle, and such cycle was repeated 50 times. The measure matrixes after the heat cycling test were considered as representing a state in use, and the self-straightening property of the measure matrixes were measured in the manners that each of the measure matrixes was held at only one end thereof to extend horizontally with the other end left free, and the lengths were measured in which the measure matrixes can extend straight without angling in the downward direction, and from these measurements the lengths in which the measure matrixes can straighten were determined. The results are shown in Table 1.

By way of comparison, further measure matrixes were prepared in the same manner by using the same cloths of glass fibers and polyester resin, except that the measure matrixes were not curved as defined in the present invention. Particularly, Comparative Example 1=measure matrix comprising the cloth of 19 mm in width and having the curvature radius r of 10 mm Comparative Example 2=measure matrix comprising the cloth of 19 mm in width and having the curvature radius r of 11 mm Comparative Example 3=measure matrix comprising the cloth of 25 mm in width and having the curvature radius r of 14 mm The measure matrixes obtained in the Comparative Examples 1 to 3 were subjected to the heat cycling test as mentioned above, and thereafter the self-straightening property of the measure matrixes were measured. The results are listed in Table 1.

cross section of the measure matrix be more than one-third and less than three-fourths of the circumference of the circle described by a curvature radius r of the arc.

As mentioned above, since the tape measure in the present invention is prepared by impregnating the tape material including crossing fibers with the thermosetting resin, and hardending thus impregnated material, the tape measure will be little lengthened if stretched, and is liable to restore to the original state when shaped. Furthermore, the measure matrix is bent in the width direction thereof to be in arcuate form in cross section having a specific curvature radius, particularly, the arc length in cross section of the measure matrix is made to be more than one-third and less than three-fourths of the circumferential length of the circle described by the circumferential radius of the arc, and therefore the measure matrix can be flattened by pushing the tape and can be encased by winding it around a reel. When thus wound measure matrix is unwound after having been flattened in a case for a long period of time, the measure matrix can be restored to be in the original arcuate form, and accordingly the measure matrix can be of an excellent self-straightening property. The measure matrix, therefore, is suited for the material for preparing a tape mea-

TABLE 1

| | Curvature radius when shaped r (mm) | Width of tape matrix m (mm) | One-third of circumference of circle described by curvature radius r when shaped L/3 (mm) | Curvature radius after heat cycling test R (mm) | One-sixth of circumference of circle described by curvature radius R after heat cycling text L/6 (mm) | Self-straightening length after heat cycling test (mm) |
|---|---|---|---|---|---|---|
| Example 1 | 8 | 19 | 16.7 | 13 | 13.6 | more than 1000 |
| Example 2 | 9 | 19 | 18.8 | 15 | 15.7 | more than 1000 |
| Comparative Example 1 | 10 | 19 | 20.9 | 19 | 19.9 | 850 |
| Comparative Example 2 | 11 | 19 | 23.0 | 21 | 22.0 | 820 |
| Example 3 | 8 | 25 | 16.7 | 14.5 | 15.2 | more than 1000 |
| Example 4 | 9 | 25 | 18.8 | 15.5 | 16.2 | more than 1000 |
| Example 5 | 10 | 25 | 20.9 | 20 | 20.9 | more than 1000 |
| Example 6 | 11 | 25 | 23.0 | 21 | 22.0 | more than 1000 |
| Comparative Example 3 | 14 | 25 | 29.3 | 28 | 29.3 | 950 | wherein r represents a curvature radius when shaped, m an arc length in cross section of the measure matrix, i.e., width of the measure matrix when flattened, L a circumferential length of a circle described by curvature radius (r or R), R a curvature radius while used, i.e., a curvature radius in cross section of measure matrix after heat cycling test.

Figure 8:
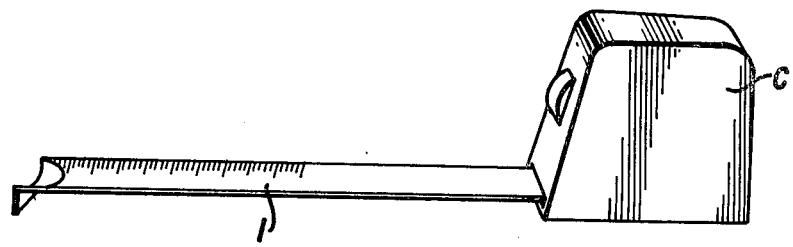
FIG. 8 is an askance view of an example of a tape measure according to the present invention.

From Table 1 are observed the following matters. In Examples 1 to 6, all the measure matrixes meet the relation $3L/4 > m > L/3$ when shaped, and meet the relating $3L/4 > m > L/6$ while used, that is, after heat cycling test, so that all the measure matrixes have satisfactory self-straightening property, because they can extend horizontally in a length more than 1 meter. In the Comparative Examples, however, the measure matrixes are in the relating $m < \frac{L}{3}$ when shaped, hence in the relation $m < L/6$ while used, so that the lengths in which they can extend straight horizontally only in lengths less than 1 meter and they have not satisfactory self-straightening property. Thus it can be concluded that, in order to obtain the satisfactory self-straightening property extending over 1 meter, it is required that, while the measure matrix is used, the arc length m in sure, as shown in FIG. 8, the tape measure is wound around a reel in a case C and can be taken out of the case if desired.

According to the method in the present invention, the tape material including crossing fibers is impregnated with the thermosetting resin still in an unhardened state, and while thus impregnated material is placed on and advanced by the belt, the impregnated material is covered with the belt on the surface thereof, bent in the width direction thereof together with the belt, heated to harden the resin while the belt and the impregnated material are being bent, hence the impregnated material is shaped to have a desired curvature in the width direction without receiving any unnatural forces, and accordingly the resulting product becomes a measure matrix made of the resin reinforced uniformly by the tape material, hence do not include any internal strain, and has not any of warp, crook and torsion. Thus, the measure matrix gives rise to any of crook and torsion. Moreover, since the measure matrix is prepared by impregnating the tape material including crossing fibers with the thermosetting resin and by hardening the resin, the measure matrix has an excellent dimensional stability and an excellent restoring property to the state when shaped. Furthermore, since the method in the present invention can be carried out continuously, the method can produce the tape measure with good efficiency. In these respects the claimed method is excellent.

What is claimed is:

1. A method for manufacturing a self-straightening tape measure of synthetic resin, which comprises impregnating a tape material prepared by crossing fibers with a thermosetting resin in an unhardened state, placing thus impregnated material between a pair of endless belts so that the impregnated material is surrounded by the belts while being further processed, bending the material together with the belts in the width direction thereof to form an arc in cross-section while the belts are being moved in the longitudinal direction thereof, adjusting a curvature of the arc so that the arc may occupy from one-third to three-fourths of the whole circumference of the circle described by extending the arc, heating the tape to harden the resin and give the impregnated material this curvature and thereafter removing the tape from the belts to obtain a self-straightening tape measure.

* * * * *